United States Patent [19]

Fritch

[11] Patent Number: 4,660,223

[45] Date of Patent: Apr. 28, 1987

[54] PROTECTIVE BODY ARMOR

[75] Inventor: Donald P. Fritch, Baldwin, N.Y.

[73] Assignee: Point Blank Body Armor, Inc., Freeport, N.Y.

[21] Appl. No.: 863,085

[22] Filed: May 14, 1986

[51] Int. Cl.$^4$ .............................................. F41H 1/02
[52] U.S. Cl. ........................................ 2/2.5; 428/911
[58] Field of Search ............................ 2/2.5; 428/911

[56] References Cited

U.S. PATENT DOCUMENTS

| | | | |
|---|---|---|---|
| 2,771,384 | 11/1956 | Collins | 2/2.5 X |
| 3,867,239 | 2/1975 | Alesi et al. | 2/2.5 X |
| 3,894,472 | 7/1975 | Davis | 2/2.5 X |
| 3,971,072 | 7/1976 | Armellino | 2/2.5 |
| 4,316,286 | 2/1982 | Klein | 2/2.5 |
| 4,413,357 | 11/1983 | Sacks | 2/2.5 |
| 4,529,640 | 7/1985 | Brown et al. | 428/911 X |
| 4,578,821 | 4/1986 | Zufle | 2/2.5 |

FOREIGN PATENT DOCUMENTS 2069318 8/1981 United Kingdom ................ 2/2.5

OTHER PUBLICATIONS

"Army's Armored Vest", The Washington Post, p. A14, Jan. 4, 1962.

Primary Examiner—Louis K. Rimrodt
Attorney, Agent, or Firm—McAulay, Fields, Fisher, Goldstein & Nissen

[57] ABSTRACT

Multiple panels are assembled to provide front and back body armor inserts to be worn under regular clothing. Each panel consists of a ply of titanium metal bonded to a ply of aramid fiber woven cloth. The panels are arranged in overlapping and in abutting relationship but are not joined to one another except by way of overlying and underlying felted material plies. This provides an insert that is capable of some degree of flexing and adjustment on the body of the wearer. Back up strip panels protect the wearer along the abutting zones of the main panels.

12 Claims, 10 Drawing Figures

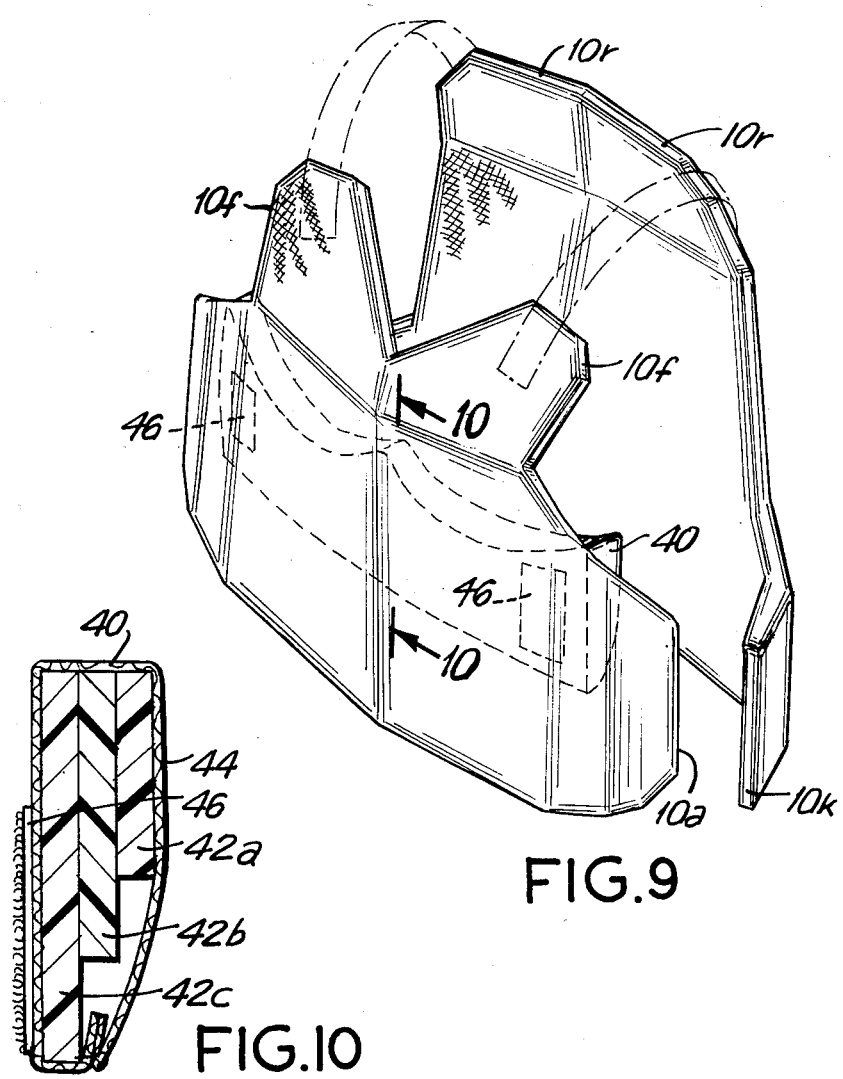

PROTECTIVE BODY ARMOR

BACKGROUND OF THE INVENTION

This invention relates to protective body armor and more particularly to such body armor which protects the wearer from both sharp objects and bullets.

The use of protective body armor comprising cloth woven from aramid fibers to protect wearers from bullets is known in the art. Commercial cloth is available that is made from an aramid fiber sold by Dupont under the trademark Kevlar. The cloth, depending upon its thickness, provides varying degrees of protection.

In various circumstances the danger of bodily harm is not from bullets, but rather sharp objects such as knives, ice picks and pointed weapons. In particular, in corrective facilities, most attacks against correction officers are made with various types of blades.

Although it has been found that the woven aramid fabric protects from bullets, it does not afford protection from blades which cut the fabric to allow the blade to enter the body or from ice picks which part fibers to permit penetration.

Protective armor must be comfortable to wear. If not, there is a likelihood that it will not be used. Thus, in addition to providing a garment which prevents injury, manufacturers must provide garments which are relatively lightweight and flexible.

Accordingly, it is a purpose of this invention to provide protective body armor which can protect the wearer from thrusts of sharpened objects.

Additionally, it is another purpose of this invention to provide such armor which also protects the wearer from injury caused by bullets.

A further purpose of this invention is to provide protective armor which is worn under an outer jacket or in specially developed pockets of a covering jacket so that it will not be evident on visual inspection that it is being worn.

The requirements of comfort and concealability place great constraints on the design of body armor and thus it is an object of this invention to provide the protective features in a design that is concealable and reasonably comfortable to wear for an extended period.

BRIEF DESCRIPTION OF THE DRAWINGS

FIG. 2 shows only the panels while FIG. 3 shows other layers of the body armor insert.

FIG. 5 is broken away to show various layers and plies.

FIG. 8 is a cross sectional view along the plane 8—8 of FIG. 4 illustrating a cross section of a "seagull" shaped back-up strip of body armor plate. To clarify the illustration, FIG. 8 shows only the back-up strip plate and does not illustrate the various felted layers and main plates that are behind or in front of the FIG. 8 strip plate.

FIG. 9 is an elevation view similar to that FIG. 4, though somewhat simplified, to show the position of a spacing pad which can be worn under the breasts of a woman guard to partially transfer the weight of the armor from the breasts of the wearer to the rib cage and upper abdomen of the wearer.

FIG. 10 is a cross sectional view along plane 10—10 of FIG. 9 illustrating the structure of the spacer element.

BRIEF DESCRIPTION

In brief, one embodiment of this invention involves the provision of a body armor insert which includes a plurality of armor panels. Each panel is formed of a ply of titanium metal bonded to a ply of cloth woven from aramid fibers. The cloth ply is positioned on the strike side of the panel. These panels are arranged to form an insert. In the insert some of the panel edges overlap and some panel edges are in a butt relationship. A first layer of felted material is bonded across the arrangement of panels on the cloth ply side. A second layer of felted material is bonded across the arrangement of panels on the metal ply side. The felted layers hold the components in position so that each component is free to move relative to the other components to the extent permitted by the felted layers and the overlapping and butt joints. Backup strips of such panels are positioned inward from the butt joints to assure the integrity of the armor. The assemblage is encased in a nylon fabric shell to form the insert.

DESCRIPTION OF THE PREFERRED EMBODIMENTS

Figure 1:
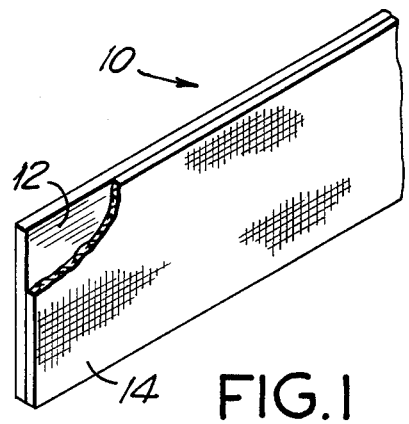
FIG. 1 is a perspective view of a typical panel of this invention showing the two ply arrangement of titanium metal and woven ballistic cloth.

As shown in FIG. 1, each body armor panel 10 of the embodiment shown includes a first ply 12 formed of titanium metal bonded to a second ply 14 formed of woven aramid fibers. The panels 10 are arranged in the body armor insert 16 such that the cloth ply 14 is worn to be on the strike side (that is, outer side) of the insert 16.

Figure 2:
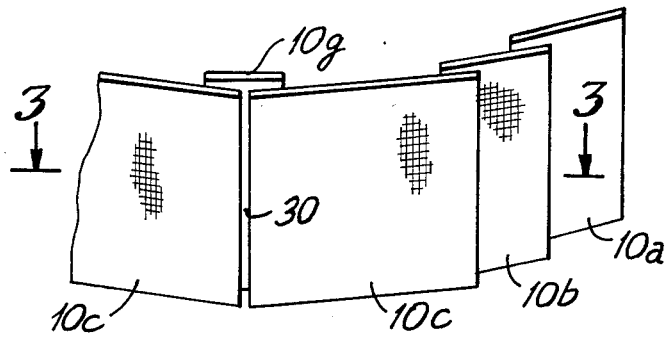
FIG. 2 is a perspective assemblage of a number of panels having the composition of the FIG. 1 panel arranged in overlapping and in butt relationship as they are in a portion of the item of body armor made from the FIG. 1 panels.

A plurality of panels 10 are arranged to form a protective insert. A portion of such an insert is shown in FIG. 2. To form an insert, the panels are placed in various relationships relative to one another. Certain panels, such as panels 10a, 10b and 10c, are positioned with overlapping edges. Certain panels, such as the two panels 10c are positioned such that their edges are in a butt or approximate butt relationship. All of the panels 10 of the insert are oriented such that the cloth ply 14 is on the strike side. Certain of the panels 10 may be bent or curved to better conform to body curvatures.

Figure 3:
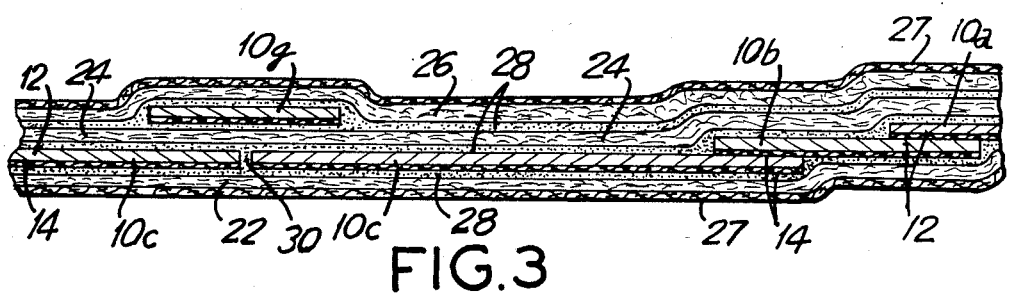
FIG. 3 is a cross-sectional view along plane 3—3 of FIG. 2 to show the multi-layer relationship of panels, felted layers and bonding material.

As shown in FIG. 3, each insert includes a first felted ply 22, composed of aramid fibers in felted form which is bonded to the cloth plies 14 of the panels 10. A second felted ply 24 composed of aramid fibers in felted form is bonded to the titanium plies 12 of the panels 10. Panels 10 in strip form cover the seams formed by abutting edges. These strip panels 10 like the rest of the panels 10 are formed of a titanium ply 12 bonded to a cloth ply 14 made of woven aramid fibers.

A third felted ply 26 composed of aramid fibers in felted form is bonded to the strips 10 and to the second felted ply 24 to hold strips 10 in place and to provide cushioning. The external or strike side of the insert is further from the wearer's body. The third felted ply 26 is closer to the wearer's body. From the orientation of the wearer's body, the strips 10 are outboard of third felted ply 26. The second felted ply 24 is outboard of the strips 10.

The three plies 22, 24 and 26 of felted material extend a minimum of one-quarter inch beyond the edges of the assembly of panels 10 in order to provide an additional degree of comfort and to assure that the edges of the panels 10 do not dig into the torso of the wearer.

The panel edges which overlap do so by close to one inch. This amount has been found necessary to assure that a knife which hits an overlap joint will be travelling parallel to the body surface if it gets through the joint and thus will inflict no wound or only a surface flesh wound. Accordingly, the strip panels 10 have a width of about two inches so as to provide substantially a one inch overlap on either side of the butt joint for the same reasons.

The body armor assemblages are enclosed in a woven nylon shell 27 in order to keep the panels and plies clean. The resulting assemblage with nylon shell is referred to as an insert because it is normally inserted into a rather large pocket arrangement in a shirt or other garment made for the purpose. However, the insert can be worn free of any such outer shell or carrier. It is to be understood in the specification and claims that the reference to the insert is without prejudice to it being used with or without a carrier.

The felted plies 22, 24, 26 are the only components of the insert 16 that hold the panels 10 in their predetermined relationship to one another. Adhesive plies 28 are shown in exaggerated thickness to indicate how the various layers 10, 22, 24, 26 are held together.

Because the various panels 10 are not bonded to one another but rather are held in position solely by the felted plies 22, 24 and 26, the panels 10 are free to move relative to one another to the extent permitted by the felted plies and by the overlapping and butt edges. Thus, the insert is reasonably flexible, capable of conforming to body contours and avoid inhibiting body movement.

The main panels 10 are curved about a vertical, most of them with a radius of curvature of about ten inches. This curvature approximates torso contours so as to provide comfort and also to conceal the fact that the wearer has body armor on. Comfort and concealability are two major objects for body armor. The combination of the curved form of the panels and the flexibility provided by the joints result in enhanced comfort and concealability.

Figure 4:
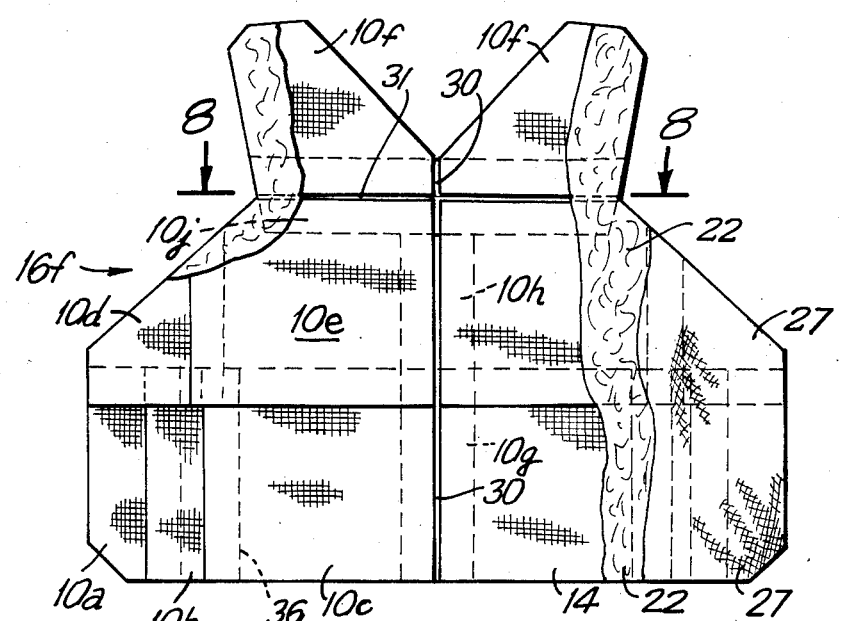
FIG. 4 is an elevation view, partially broken away, of a front body armor insert to be worn over the front torso of the individual wearing the entire body armor garment.
Figure 5:
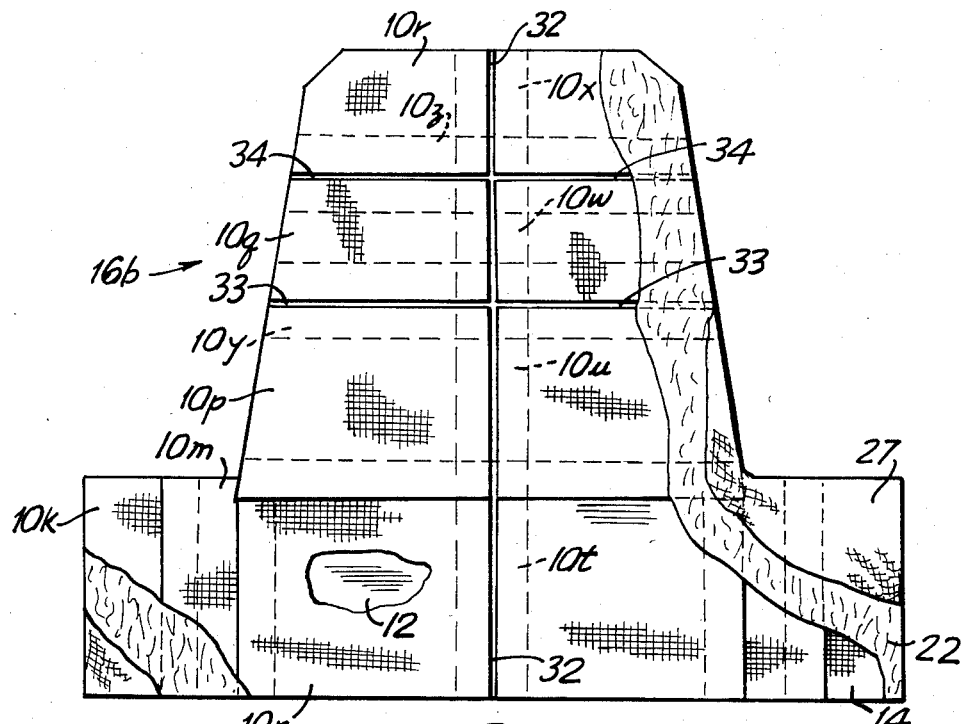
FIG. 5 is a view similar to that of FIG. 4 except it is of the back insert. Like FIG. 4.
Figure 6:
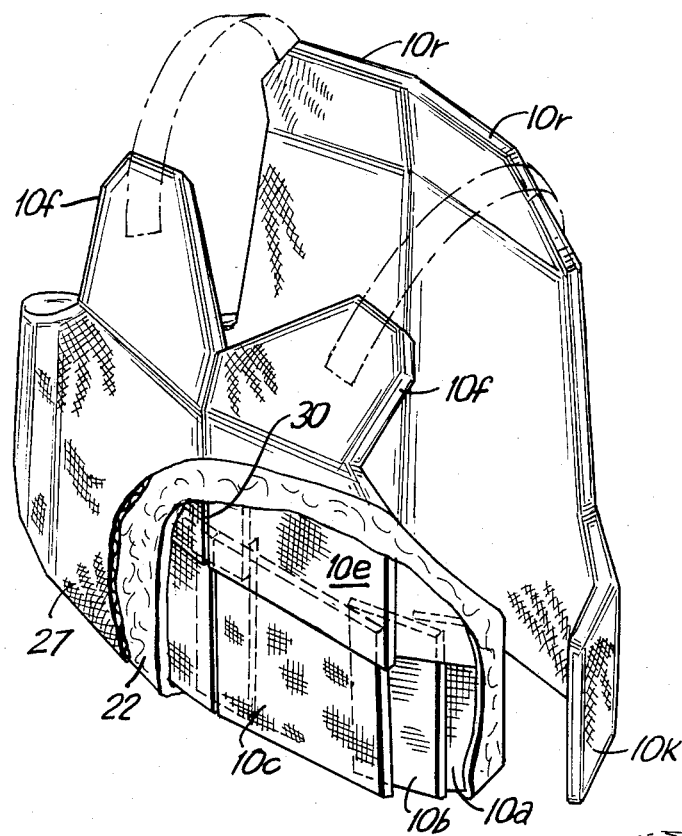
FIGS. 6 and 7 are perspective views, partially broken away, of the two body armor inserts in relationship to one another.
Figure 7:
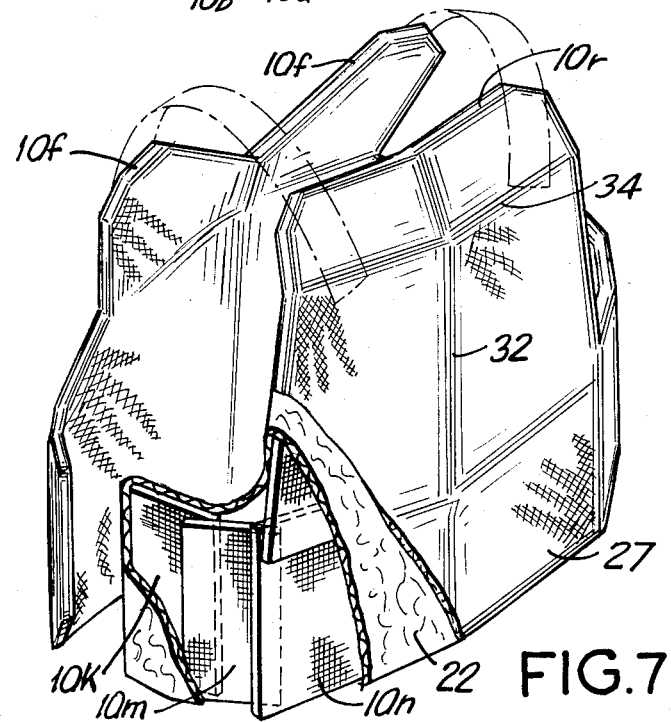

As shown in the FIGs. certain panels such as the panels 10c and 10c' have a butt relationship. It should be understood that this butt relationship does not necessarily mean that the panel edges contact. They are closely spaced to one another usually with a tolerance of about one-eighth of an inch. The strip panels 10 are to assure protection over this butt zone. The reason for the butt relationship is to provide sufficient adjustability for the armor inserts so that they will fit on the body of the wearer in a fashion that makes the armor substantially concealed. Without the butt relationships, the armour would tend to stick out too noticeably along the lines of the butt relationships shown in FIGS. 4 and 5. In order to make the armor concealable under the shirt of the wearer, these butt relationships are necessary. As shown in FIG. 4, the front armor insert 16f has one vertical butt relationship zone 30 that involves six panels and one horizontal butt relationship zone 31 which involves four panels. As shown in FIG. 5 the back armor insert 16b has one vertical butt relationship zone 32 involving eight panels, a first horizontal butt relationship zone 33 involving four panels and a second horitzonal butt relationship zone 34 involving four panels.

The overlapping edge relationships are shown in FIGS. 4 and 5 by dotted lines. For example, the dotted line 36 indicates an edge of the panel 10b which extends under an edge of the panel 10c to create an overlap joint.

In FIGS. 4 and 5 the nylon shell 27 and the felted ply 22 have been broken away over most of the figures so that the main panels 10 are shown. In both cases, the strike side of the panels 10 is shown so that it is the woven aramid cloth 14 surface which is being shown. However, at one small location in FIG. 5, the cloth 14 is broken away to show the underlying titanium ply 12. Both FIGS. 4 and 5 show that each of the inserts 16f and 16b have twelve panels 10 not including the strip panels 10.

To form a protective vest 38 a front insert 16f and a back insert 16b are inserted into large pockets of a cloth garment (not shown) to provide protection to the entire torso including the rib cage and kidney areas.

In a preferred embodiment, the vest 38 has twelve main panels 10 and three strip panels 10 for its front insert 16f. It also has twelve main and eight strip panels 10 for its back insert 16b. It can be provided with a foam pad 40 to prevent pressure being exerted on the breasts of female users (see FIG. 9). Although optimum protection is afforded by a vest with components protecting the entire torso, a lighter weight vest having fewer components, strategically positioned, is usable.

More specifically, in that embodiment, the panels 10a and 10b are approximately 2.5 inches wide by 5.5 inches tall. They overlap one another by one inch. The panel 10c is 6.25 inches wide and 5.5 inches tall. It overlaps panel 10b by one inch. Thus, taking into account their overlap, the three panels 10a, 10b and 10c cover an area nine inches across one-half of the chest. As shown in FIG. 4, the outer corner of the panel 10a is chamfered. These three panels 10a, 10b and 10c are curved about a vertical axis and have a radius of curvature between about eight and ten inches.

Panel 10d is 2.5 inches wide and has a short vertical edge with a height of 1.5 inches and a long vertical edge with a height of 4.75 inches. The connecting sloping edge is thus approximately 4.85 inches. Panel 10e is 6.5 inches wide and 5.5 inches tall with an upper left corner chamfered to continue the sloping line of the panel 10d. Panel 10e overlies panel 10d with a one inch overlap. Both panels 10d and 10e overlie the panels below them with a one inch overlap. The remaining panel 10f is 4.75 inches wide and has a maximum height of 4.5 inches. Its vertical height at the center line 30 is one inch. Panels 10d 10c and 10f are curved about a vertical axis and have a radius of curvature between eight and ten inches. The upper edge of panel 10f may be bent back slightly to avoid a visible edge. Along the line 31, the panels 10e and 10f have an abutting relationship; they do not overlap. A mirror image set of panels is provided to constitute the other half of the front insert 16f. As shown in FIG. 4, the two sets of panels that provide the two halves of the front insert 16f are arranged in an abutting relationship along the vertical line 30.

There are a total of three strip panels used in connection with the front insert 16f to provide additional protection along the abutting zones 30 and 31. These strip panels are a first strip panel 10g which is two inches wide and 5.5 inches tall along the lower portion of the zone 30. A second strip panel 10h is two inches wide and 4.5 inches tall along the upper portion of the zone 30. The lower end of 10h overlaps the upper end of 10g by one inch. Thereby providing a nine inch length of strip panels. A somewhat more complex bowed strip panel 10j is two inches wide and approximately 9.5 inches long. It is arranged behind the zone 31 and extends across the entire front insert 16f. As shown, this strip panel 10j has a somewhat complex "seagull" profile shape so as to conform to a line across the torso of the wearer and to avoid a chicken breast effect. Each half of the panel 10j has a radius of curvature of between eight and ten inches to match the curvature of the panels 10f. The upper portion of panel 10h is creased along a vertical line so as to approximately match the profile of the strip panel 10j at the horizontal zone 31. The strip panels 10h and 10j have an abutting relationship and do not overlap.

The back insert 16b has overlapping end panels 10k and 10m which are each 3.0 inches wide and 6.5 inches tall. A center bottom panel 10n is 6.5 inches by 6.5 inches and overlaps panel 10m by one inch thereby providing approximately a ten inch horizontal distance over the bottom portion of one half of the back insert 16b. The panel 10p is 5 inches tall and overlaps by one inch the panel 10n. The panel 10p is 6.5 inches at its base line and tapers to approximately 5.8 inches along its top at the zone 34. The panel 10q is 3.25 inches high and tapers from 5.8 inches to 5.25 inches. The panel 10r has a 3 inch vertical dimension and continues the edge taper to a small chamfer at the upper corner which results in a 4 inch horizontal dimension at the top of the panel 10r. As shown in FIG. 5, the panels 10p, 10q and 10r have an abutting relationship to one another at zones 33 and 34. The set of panels 10k through 10r are matched by a mirror image set of panels to form the other half of the back insert 16b. The two halves of the insert 16b have an abutting relationship along the vertical zone 32. However, panels 10n, 10p, 10q and 10r are curved about a vertical axis and have a radius of curvature between ten and twelve inches. Panels 10k and 10m are curved about a vertical axis and have a curvature comparable to that of the front panels 10a through 10f. Because of the abutting zones, the amount of curvature of the panels is minimized and, in particular, the upper panels 10f, 10q and 10p need not be curved about a horizontal axis and thus complex curvatures are avoided.

A number of strip panels are employed to provide protection along the abutting zones 32, 33 and 34. All of these strip panels are two inches wide and thus only their lengths are indicated here. The vertically aligned strip panels 10t, 10u, 10w and 10x are respectively 6.5, 5.0, 3.25 and 3.0 inches long. The panels 10t and 10u have a one inch overlap whereas the rest of the relationships among these four strip panels are abutting relationships. The horizontal strip panel 10y has a center length of approximately 5.85 inches and the horizontal strip panel 10z has a center length of approximately 5.35 inches. These two panels 10y and 10z provide protective back-up along the zones 33 and 34 and are matched by mirror image panels on the other side of the insert 16b. The outer end of the panels 10y and 10z are tapered to conform to the taper defined by the panels 10p, 10q and 10r.

In a preferred embodiment, each titanium ply 12 is about 0.04 inches (0.10 cm) thick. This is effective to prevent a sharp instrument from penetrating. Each cloth ply 14 has a woven texture which provides a non-skid surface that serves to mechanically catch a blade tip or ice-pick tip. This prevents the tip from moving along the surface to a joint in the insert or to another area through which it could penetrate.

In a preferred embodiment, each felted ply is made of high density, high tensile, felt fabric having a thickness of about 0.090 inches (0.22 cm), a weight of about 10 ounces/sq. yard. The total thickness of a vest 38 formed from the inserts 16f and 16b is approximately three-eighth of an inch (0.95 cm) and has a weight, in a medium size, of about 6.1 pounds (2.76 kg) making the vest comfortably wearable for about eight hours.

In tests, it has been found that a vest employing these inserts 38 will resist eighty ft. lbs. of energy applied to ice picks and bowie knives. The vest also stopped the following threats at 0° obliquity.

| BULLET TYPE | BARREL LENGTH (inches) | VELOCITY |
| --- | --- | --- |
| .38 CAL. - 158 GR. S.W.C. LEAD | 4" | 775 F.P.S. |
| .32 CAL. - AUTO 88 GR. | 3" | 680 F.P.S. |
| 12 Gauge - NO. 4 LEAD SHOT | 18" | — |

Bullet resistance may be increased by the addition of aramid fabric layers on the body side.

In California, as much as one third of the correction officers are female. Accordingly, it is important that the body armor be designed to minimize the weight or pressure on a woman's breasts. The spacer element 40 serves to prevent undue pressure being exerted on the breasts of female users. The spacer 40 rests on the lower part of the wearer's rib cage. The armor, in turn, rests on the spacer 40 and thus the weight of the armor and the pressure that results is partially transferred to the lower part of the rib cage. Thus, the spacer 40 holds the front armor insert 16f outward and takes the pressure from that insert 16f.

The embodiment of this spacer 40 shown has a number of stepped plies 42. It could be a molded insert. In addition, the number of steps is a function of the breast size of the individual for whom it will be used. It has been found when the foam is stepped as shown, that the manner in which it responds to the weight of the body armor provides a fairly even distribution of weight over the rib cage and body of the wearer. The spacer 40 is enclosed within a woven nylon shell 44. Vertically running separable fasteners 46 such as Velcro strips are attached near the outward ends of the nylon cover and mate with corresponding fastener strips that are attached to the nylon shell 27 within which the body armor insert 16f is contained. The vertical fastener strips on the nylon cover of the body armor insert 16f are longer than the corresponding strips on the spacer 40 so that the spacer 40 can be positioned at a level desired by the individual wearing the item. The smallest ply 42a is positioned closest to the body and thus the fastener element is along the nylon cover which adjacent to the largest ply 42c.

What I claim is:

1. A body armor insert comprising:

an assemblage of substantially adjacent panels, each of said panels comprising a first ply of titanium metal and a second ply of ballistic cloth woven from aramid fibers, said first and second plies bonded to one another, said assemblage having a strike face and an inner face, said cloth ply constituting the strike side of each of said panels, a first layer of felted material across said strike face of said assemblage of panels and a second layer of felted material across said inner face assemblage of panels, said first and second layers of felted material being bonded to said strike and interior faces respectively of said assemblage of panels to hold said assemblage of panels in substantially predetermined relationships.

2. The body armor insert of claim 1 wherein certain edges of adjacent ones of said panels are positioned in an overlapping relationship to provide an overlap joint and certain edges of adjacent ones of said panels are positioned in a butt relationship to provide a butt joint, said adjacent ones of said panels, whether in said edge overlapping or edge abutting relationship, being held in position solely by said felted layers and being free to move relative to one another to the extent permitted by said felted layers.

3. The body armor of claim 1 further comprising:

at least one of said panels in strip form positioned in alignment with a butt joint and positioned inward from said second layer of felted material; and a third layer of felted material inward from said panel in strip form, said third layer of felted material being bonded to said third panel and to said second layer of felted material.

4. The insert of claim 3 wherein the cloth ply of said panel form is on the strike side of said insert.

5. The insert of claim 3 wherein said titanium ply is approximately at least one mm (40 mils) thick.

6. The insert of claim 5 wherein said felted layers are substantially composed of aramid fibers in felt fabric form.

7. The insert of claim 3 wherein said felted layers are substantially composed of aramid fibers in felt fabric form.

8. The insert of claim 3 wherein certain of said panels are curved.

9. The insert of claim 1 wherein said titanium ply is approximately at least one mm (4C mils) thick.

10. The insert of claim 1 wherein said felted layers are substantially composed of aramid fibers in felt fabric form.

11. The insert of claim 1 wherein certain of said panels are curved.

12. The insert of claim 11 wherein certain of said panels are curved.

* * * * *